United States Patent
Dube et al.

(10) Patent No.: US 11,118,473 B2
(45) Date of Patent: Sep. 14, 2021

(54) VIBRATION ISOLATOR ASSEMBLY

(71) Applicant: UNITED TECHNOLOGIES CORPORATION, Farmington, CT (US)

(72) Inventors: Norman John Dube, Portland, CT (US); Michael Sapanaro, Jr., Enfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 251 days.

(21) Appl. No.: 16/381,952

(22) Filed: Apr. 11, 2019

(65) Prior Publication Data
US 2020/0325795 A1    Oct. 15, 2020

(51) Int. Cl.
| F01D 25/28 | (2006.01) |
| F01D 25/04 | (2006.01) |
| F16B 43/00 | (2006.01) |
| F16F 3/087 | (2006.01) |
| F16F 15/08 | (2006.01) |
| F01D 25/24 | (2006.01) |

(52) U.S. Cl.
CPC .......... *F01D 25/04* (2013.01); *F01D 25/243* (2013.01); *F01D 25/28* (2013.01); *F16B 43/001* (2013.01); *F16F 3/0876* (2013.01); *F16F 15/08* (2013.01); *F05D 2260/96* (2013.01)

(58) Field of Classification Search
CPC ........ F01D 25/04; F01D 25/243; F01D 25/26; F01D 25/28; F02C 7/20; F02C 7/32; B64D 29/06; F05D 2260/96; F16B 5/0258; F16F 1/3732; F16F 1/3735
See application file for complete search history.

(56) References Cited

U.S. PATENT DOCUMENTS

| 3,218,101 | A  | * | 11/1965 | Adams  .................. | F16F 3/0873 |
|           |    |   |         |                           | 296/35.1 |
| 6,910,671 | B1 |   | 6/2005  | Norkus et al. |           |
| 7,857,585 | B2 | * | 12/2010 | Dhaliwal ................ | F01D 11/24 |
|           |    |   |         |                           | 415/213.1 |
| 2005/0040576 | A1 |   | 2/2005  | Oxenknecht et al. |     |
| 2016/0348587 | A1 |   | 12/2016 | Banhos et al. |         |
| 2019/0389513 | A1 | * | 12/2019 | Flickinger ............... | F16F 15/08 |

FOREIGN PATENT DOCUMENTS

EP    3415724    12/2018

OTHER PUBLICATIONS

European Patent Office, European Search Report dated Aug. 7, 2020 in Application No. 20167941.2.

* cited by examiner

*Primary Examiner* — Gerald L Sung
*Assistant Examiner* — Rene D Ford
(74) *Attorney, Agent, or Firm* — Snell & Wilmer L.L.P.

(57) ABSTRACT

A vibration isolating bushing assembly may comprise a first T-bushing configured to receive a fastener, a second T-bushing configured to couple to the first T-bushing and the fastener, a first isolating washer, and a second isolating washer, wherein the first isolating washer and the second isolating washer are configured to couple between the first T-bushing and the second T-bushing.

15 Claims, 5 Drawing Sheets

VIBRATION ISOLATOR ASSEMBLY

FIELD

The disclosure relates generally to protective structures for aircraft components, and particularly to mounting hardware for gas turbine engine components.

BACKGROUND

Aircraft components such as cable assemblies, duct work, and turbine engine accessories may be coupled to structures which transmit vibrational loads during operation. In various instances, vibrational loading may tend to damage or degrade component performance and operating life. Component mounting hardware may include vibration isolator assemblies which tend to mitigate or eliminate transmission of undesirable vibrational loads. In various applications where space may be at a premium, mounting hardware may tend to be bulky and complex.

SUMMARY

In various embodiments the present disclosure provides a vibration isolating bushing assembly comprising a first T-bushing configured to receive a fastener, a second T-bushing configured to couple to the first T-bushing and the fastener, a first isolating washer, and a second isolating washer, wherein the first isolating washer and the second isolating washer are configured to couple between the first T-bushing and the second T-bushing.

In various embodiments, each of the first T-bushing and the second T-bushing comprise an annular cylindrical structure extending between a base end and a flange end, wherein a flange extends about the flange end perpendicular to the annular cylindrical structure. In various embodiments, the annular cylindrical structure of the second T-bushing is configured to be disposed within the annular cylindrical structure of the first T-bushing. In various embodiments, the annular cylindrical structure of the second T-bushing comprises a threaded surface at an inner diameter of the annular cylindrical structure. In various embodiments, the flange of the first T-bushing comprises a slot. In various embodiments, in response to receiving the fastener, the base end of the first T-bushing contacts the flange of the second T-bushing. In various embodiments, the first isolating washer and the second isolating washer comprise a wire mesh material. In various embodiments, each of the first isolating washer and the second isolating washer comprise a coupling portion configured to couple with a bushing retainer cup.

In various embodiments, the present disclosure provides a gas turbine engine, comprising a compressor section configured to compress a gas, a combustor section aft of the compressor section and configured to combust the gas, a turbine section aft of the combustor section and configured to extract work from the gas, and vibration isolator assembly, coupled between a turbine engine component and a structural member, and configured to attenuate a vibrational load from the structural member and, wherein, the vibration isolator assembly comprises vibration isolating bushing assembly comprising a first T-bushing configured to receive a fastener, a second T-bushing configured to couple to the first T-bushing and the fastener, a first isolating washer, and a second isolating washer, wherein the first isolating washer and the second isolating washer are configured to couple between the first T-bushing and the second T-bushing.

In various embodiments, each of the first T-bushing and the second T-bushing comprise an annular cylindrical structure extending between a base end and a flange end, wherein a flange extends about the flange end perpendicular to the annular cylindrical structure. In various embodiments, the annular cylindrical structure of the second T-bushing is configured to be disposed within the annular cylindrical structure of the first T-bushing. In various embodiments, the annular cylindrical structure of the second T-bushing comprises a threaded surface at an inner diameter of the annular cylindrical structure. In various embodiments, the flange of the first T-bushing comprises a slot. In various embodiments, the first isolating washer and the second isolating washer comprise a wire mesh material. In various embodiments, each of the first isolating washer and the second isolating washer comprise a coupling portion configured to couple with a bushing retainer cup. In various embodiments, the vibration isolator assembly comprises an elongate coupling member, wherein the bushing retainer cup is coupled to the elongate coupling member. In various embodiments, the slot is configured to engage with a protrusion of the turbine engine component and inhibit the first t-bushing from rotating with respect to the turbine engine component. In various embodiments, in response to receiving the fastener, the base end of the first T-bushing contacts the flange of the second T-bushing.

In various embodiments, the present disclosure provides an article of manufacture including a vibration isolating bushing assembly, comprising a first T-bushing comprising a first annular cylindrical structure extending between a first base end and a first flange end, wherein a first flange extends about the first flange end perpendicular to the first annular cylindrical structure, a second T-bushing comprising a second annular cylindrical structure extending between a second base end and a second flange end, wherein a second flange extends about the second flange end perpendicular to the second annular cylindrical structure, wherein, the second annular cylindrical structure is disposed within an inner diameter of the first T-bushing and wherein the second annular cylindrical structure comprises a threaded surface at an inner diameter of the second annular cylindrical structure, and an isolating washer comprising a flexible material coupled about an outer diameter of the first annular cylindrical structure and compressed between the first flange and the second flange.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
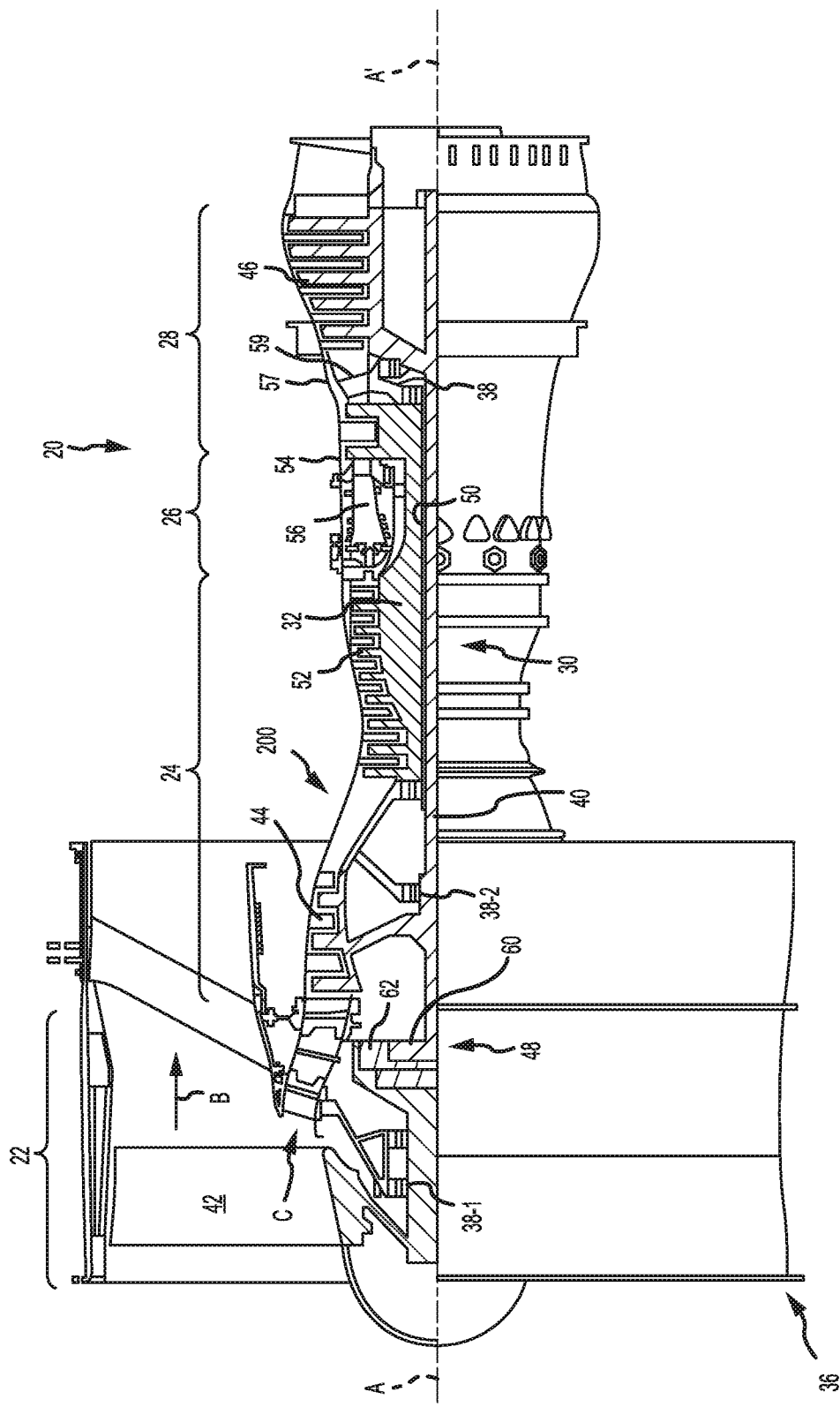
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2:
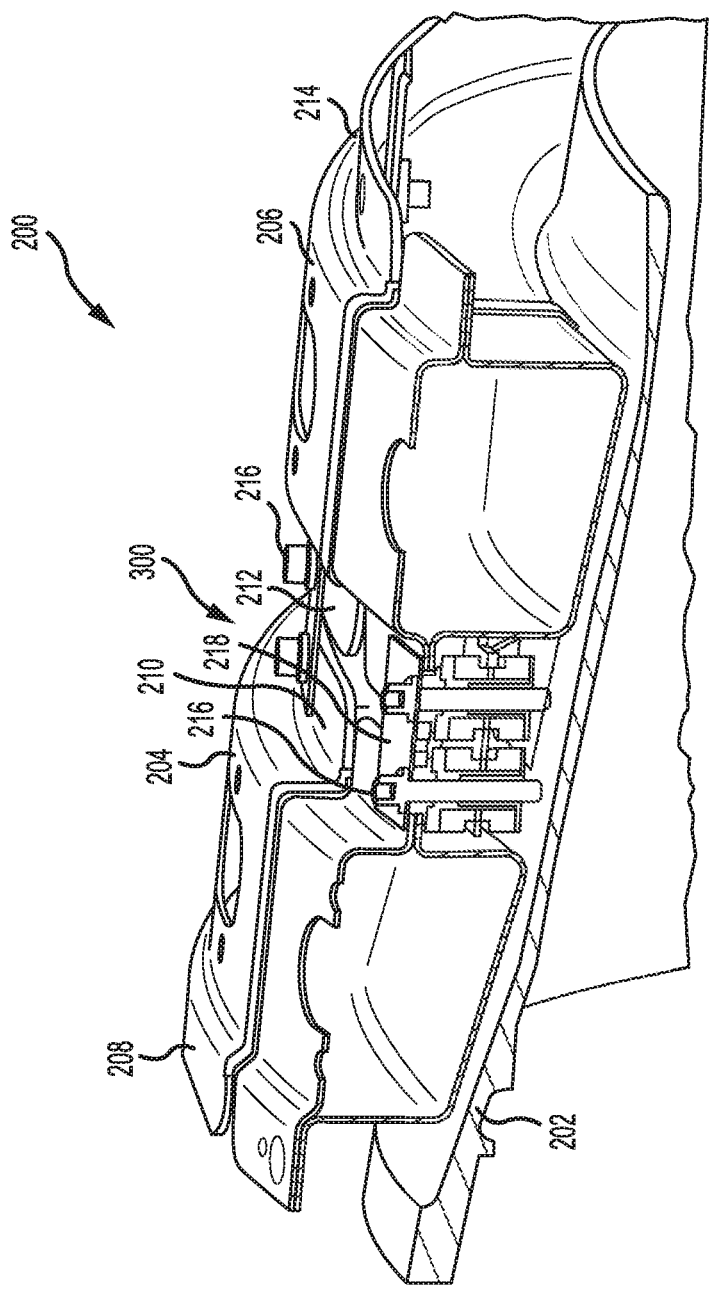
FIG. 2 illustrates a vibration isolated duct assembly for a gas turbine engine, in accordance with various embodiments.

According to various embodiments and with reference to FIGS. 1 and 2, a vibration isolated duct assembly 200 is shown in cross section along the rotational axis A-A' of gas turbine engine 20. The vibration isolated duct assembly 200 is coupled radially outward of a structural member 202 such as, for example, a turbine engine case such as HPC 52 case. Vibration isolated duct assembly 200 includes a first duct 204 and a second duct 206 (i.e., forward and aft ducts). Each duct may include a forward and aft mounting flange extending axially from the duct and approximately (i.e. within 45°) perpendicular to the structural member 202. The first duct 204 includes a first flange 208 and a second flange 210. The second duct 206 includes a third flange 212 and a fourth flange 214. Each duct (204, 206) may be coupled to the structural member 202 via the respective flange (208, 210, 212, 214) and, in this regard, the flanges may tend to receive vibrational loads from the structural member 202. In response to the vibrational loads, the flanges (208, 210, 212, 214) may tend to fatigue. In various embodiments, fatigue may be a function of the temperature environment and accelerated as environmental temperatures increase.

In various embodiments, the vibration isolated duct assembly 200 includes a vibration isolator assembly 300 coupled between the flanges (208, 210, 212, 214) and the structural member 202. For example, vibration isolator assembly 300 may be coupled between the second flange 210, the third flange 212, and the structural member 202. In response to receiving the vibrational load from the structural member 202, the vibration isolator may attenuate or otherwise mitigate the vibrational load and transmit an attenuated vibrational load to the flanges (210, 212). In this regard, the vibration isolator assembly 300 may tend to inhibit fatigue of a component such as a turbine engine component. In various embodiments, the vibration isolator assembly 300 may be coupled to the flanges (210, 212) by fasteners 216 through cover plate 218. In various embodiments, the vibration isolator assembly 300 may be optimized for environmental temperatures of between 500° F. [260° C.] and 1000° F. [538° C.].

Figure 3:
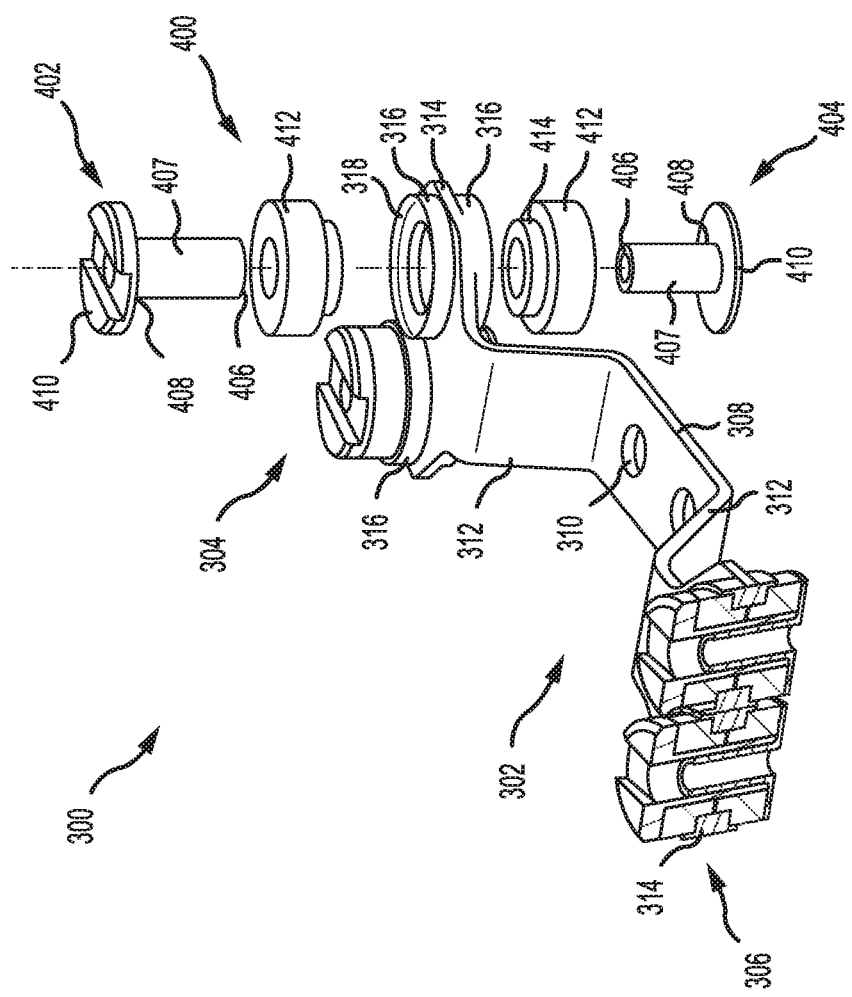
FIG. 3 illustrates a vibration isolator assembly, in accordance with various embodiments.

In various embodiments and with additional reference to FIG. 3, an exploded and sectioned view of vibration isolator assembly 300 is illustrated. The vibration isolator assembly 300 comprises an elongate coupling member 302 extending between a first end 304 and a second end 306. A center portion 308 of the elongate coupling member 302 may be configured to interface with the structural member 202. For example, the center portion 308 may include one or more fastener holes 310. In various embodiments the elongate coupling member 302 may be a stamping and comprise angular portions 312 which may displace the first end 304 and the second end 306 from a plane of the center portion 308. The first end 304 and/or the second end 306 may be flared to form a head 314 configured to couple with a vibration isolating bushing assembly 400. Each head 314 may comprise one or more bushing retainer cups 316 coupled to the head 314. The bushing retainer cup structure comprises an annular washer having circumferential wall extending perpendicular to a face of the washer disk to define a cup 318.

Figure 4:
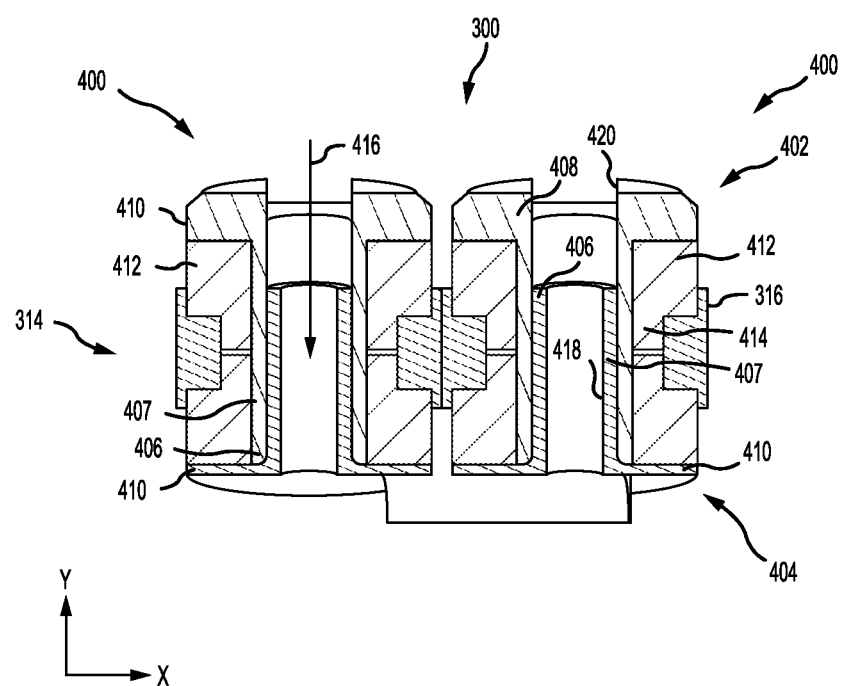
FIG. 4 illustrates a vibration isolating bushing assembly, in accordance with various embodiments.

In various embodiments and with additional reference to FIG. 4, head 314 of second end 306 is illustrated in cross section through the XY-plane of vibration isolating bushing assemblies 400. Each vibration isolating bushing assembly 400 comprises a first T-bushing 402 and a second T-bushing 404. Each of the T-bushings comprises an annular cylindrical structure 407 (i.e., a first annular cylindrical structure and a second annular cylindrical structure) extending from a base end 406 to a flange end 408. A flange extends about the flange end 408 perpendicular to the annular cylindrical structure 407. Isolating washers 412 (i.e., a first isolating washer and a second isolating washer) are coupled about the annular cylindrical structures 407 between the first T-bushing 402 and the second T-bushing 404. The annular cylindrical structure of the first T-bushing 402 has a relatively larger inner diameter than the outer diameter of the annular cylindrical structure of the second T-bushing 404. In this regard the annular cylindrical structure of the second T-bushing 404 may be configured to be disposed within the annular cylindrical structure of the first T-bushing 402.

In various embodiments, the first T-bushing 402 and the second T-bushing 404 may be coupled along the extent of the annular cylindrical structures 407 such as by an interference fit thereby retaining the isolating washers 412 between the flanges 410. Each of the first T-bushing 402 and the second T-bushing 404 may be configured to receive a fastener such as fastener 216 which may be inserted through an annulus of the annular cylindrical structures 407 as shown by arrow. The second T-bushing 404 may be configured to couple to the fastener such as, for example, by including a threaded surface 418 at an inner diameter of the annular cylindrical structure of the second T-bushing 404. In various embodiments, the flange 410 of the first T-bushing 402 comprises a slot 420.

Figure 5:
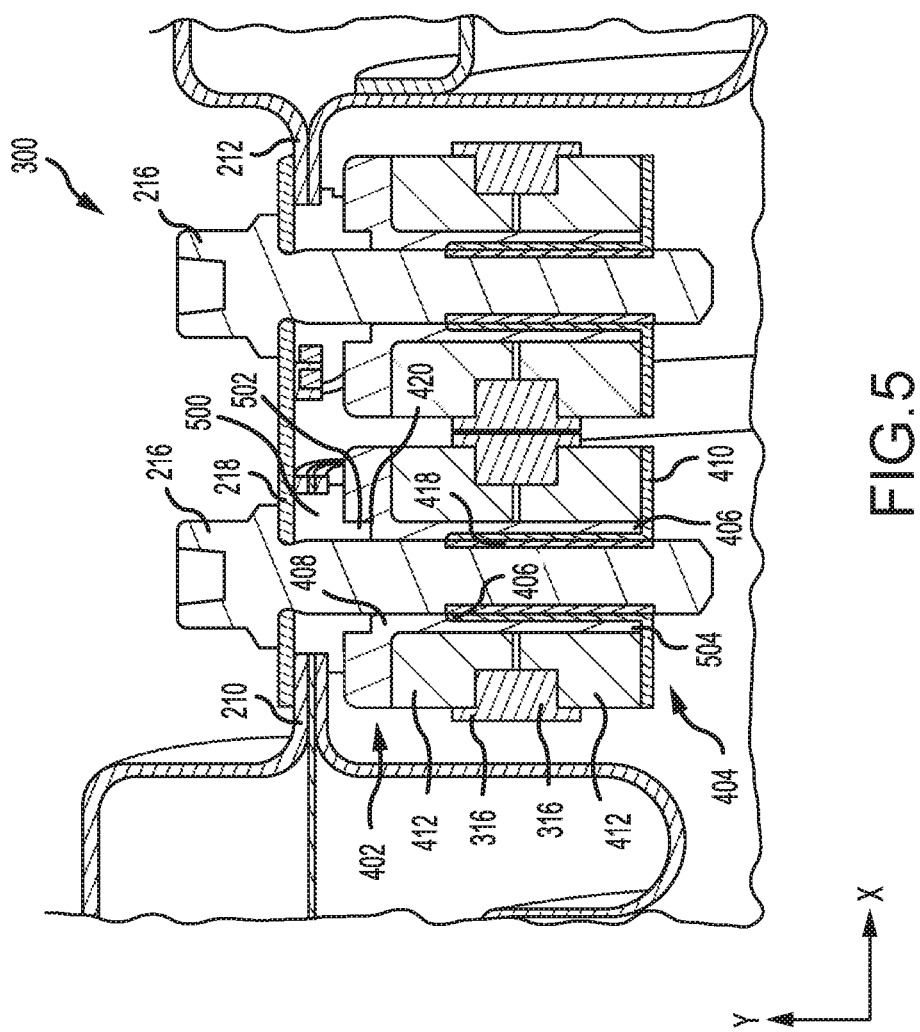
FIG. 5 illustrates a vibration isolator assembly, in accordance with various embodiments.

In various embodiments and with additional reference to FIG. 5, vibration isolator assembly 300 is illustrated in cross section through the XY-plane of vibration isolating bushing assemblies 400 as coupled to flanges (210, 212) of ducts (204, 206). In various embodiments each flange (210, 212) comprises a nut plate 500 which is disposed proximate the first T-bushing 402. The nut plate 500 includes a protrusion 502 configured to engage the slot 420 in the flange 410 of the first T-bushing 402. Fastener 216 is disposed through the annular cylindrical structures 407 of the T-bushings (402, 404) and coupled to the second T-bushing 404 via threaded surface 418. In response to torquing fastener 216 the first T-bushing 402 and/or the second T-bushing 404 may tend to rotate. An interference between the slot 420 and the protrusion 502 may tend to inhibit the first T-bushing 402 from rotating with respect to the flange 210.

In various embodiments and in response to applying torque at the fastener 216 the base end 406 of the second T-bushing 404 may be drawn relatively toward the flange end 408 of the first T-bushing 402 thereby closing gap 504. The isolating washers 412 may comprise a relatively compressible and/or flexible material such as, for example, a rubber, a silicone, a synthetic rubber, a wire mesh and/or the like. In this regard, the isolating washers 412 may be compressed between the respective flanges 410 into the bushing retainer cups 316. Stated another way, in response to receiving the fastener, the base end 406 of the first T-bushing 402 contacts the flange 410 of the second T-bushing 404 tending thereby to inhibit over compression of the of the isolating washers 412 and/or limiting compression of the isolating washers 412 to a desired value. In this regard, the compression of the isolating washers 412 may be configured by altering the gap 505 and, thereby, the vibration isolator assembly 300 may be tuned for a desired attenuation of vibrational loads in response to altering the gap 505.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A vibration isolating bushing assembly, comprising:
   a first T-bushing configured to receive a fastener;
   a second T-bushing configured to couple to the first T-bushing and the fastener;
   a first isolating washer; and
   a second isolating washer, wherein the first isolating washer and the second isolating washer are configured to couple between the first T-bushing and the second T-bushing,
   wherein each of the first T-bushing and the second T-bushing comprise an annular cylindrical structure extending between a base end and a flange end, wherein a flange extends about the flange end perpendicular to the annular cylindrical structure,
   wherein the flange of the first T-bushing comprises a slot, and
   wherein the slot is configured to engage with a protrusion of a turbine engine component and inhibit the first T-bushing from rotating with respect to the turbine engine component.

2. The vibration isolating bushing assembly of claim 1, wherein the annular cylindrical structure of the second T-bushing is configured to be disposed within the annular cylindrical structure of the first T-bushing.

3. The vibration isolating bushing assembly of claim 1, wherein the annular cylindrical structure of the second T-bushing comprises a threaded surface at an inner diameter of the annular cylindrical structure.

4. The vibration isolating bushing assembly of claim 1, wherein in response to receiving the fastener, the base end of the first T-bushing contacts the flange of the second T-bushing.

5. The vibration isolating bushing assembly of claim 1, wherein the first isolating washer and the second isolating washer comprise a wire mesh material.

6. The vibration isolating bushing assembly of claim 1, wherein each of the first isolating washer and the second isolating washer comprise a coupling portion configured to couple with a bushing retainer cup.

7. A gas turbine engine, comprising:
   a compressor section configured to compress a gas;
   a combustor section aft of the compressor section and configured to combust the gas;
   a turbine section aft of the combustor section and configured to extract work from the gas;
   and vibration isolator assembly, coupled between a turbine engine component and a structural member, and configured to attenuate a vibrational load from the structural member and,
   wherein, the vibration isolator assembly comprises vibration isolating bushing assembly comprising:
   a first T-bushing configured to receive a fastener;
   a second T-bushing configured to couple to the first T-bushing and the fastener;
   a first isolating washer; and
   a second isolating washer, wherein the first isolating washer and the second isolating washer are configured to couple between the first T-bushing and the second T-bushing,
   wherein each of the first T-bushing and the second T-bushing comprise an annular cylindrical structure extending between a base end and a flange end, wherein a flange extends about the flange end perpendicular to the annular cylindrical structure,
   wherein each of the first T-bushing and the second T-bushing comprise an annular cylindrical structure extending between a base end and a flange end, wherein a flange extends about the flange end perpendicular to the annular cylindrical structure,
   wherein the flange of the first T-bushing comprises a slot, and
   wherein the slot is configured to engage with a protrusion of the turbine engine component and inhibit the first T-bushing from rotating with respect to the turbine engine component.

8. The gas turbine engine of claim 7, wherein the annular cylindrical structure of the second T-bushing is configured to be disposed within the annular cylindrical structure of the first T-bushing.

9. The gas turbine engine of claim 7, wherein the annular cylindrical structure of the second T-bushing comprises a threaded surface at an inner diameter of the annular cylindrical structure.

10. The gas turbine engine of claim 7, wherein the first isolating washer and the second isolating washer comprise a wire mesh material.

11. The gas turbine engine of claim 7, wherein each of the first isolating washer and the second isolating washer comprise a coupling portion.

12. The gas turbine engine of claim 11, wherein the vibration isolator assembly comprises an elongate coupling member, wherein a bushing retainer cup is coupled to the elongate coupling member, and wherein the coupling portion is configured to couple to the bushing retainer cup.

13. The gas turbine engine of claim 7, wherein the turbine engine component is a duct.

14. The gas turbine engine of claim 7, wherein, in response to receiving the fastener, the base end of the first T-bushing contacts the flange of the second T-bushing.

15. An article of manufacture including a vibration isolating bushing assembly, comprising:

a first T-bushing comprising a first annular cylindrical structure extending between a first base end and a first flange end, wherein a first flange extends about the first flange end perpendicular to the first annular cylindrical structure;

a second T-bushing comprising a second annular cylindrical structure extending between a second base end and a second flange end, wherein a second flange extends about the second flange end perpendicular to the second annular cylindrical structure, wherein, the second annular cylindrical structure is disposed within an inner diameter of the first T-bushing and wherein the second annular cylindrical structure comprises a threaded surface at an inner diameter of the second annular cylindrical structure; and an isolating washer comprising a flexible material coupled about an outer diameter of the first annular cylindrical structure and compressed between the first flange and the second flange, wherein the flange of the first T-bushing comprises a slot, and wherein the slot is configured to engage with a protrusion of a turbine engine component and inhibit the first T-bushing from rotating with respect to the turbine engine component.

\* \* \* \* \*